Dec. 19, 1922.
L. C. VANDERLIP.
SELF ADJUSTING BEARING NUT.
FILED JUNE 29, 1922.
1,438,971.
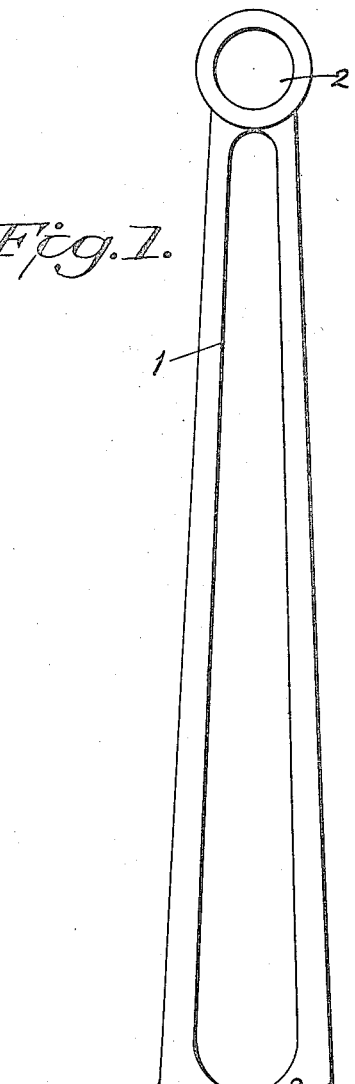
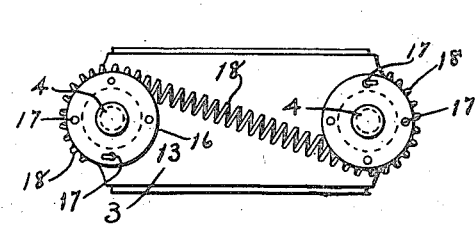
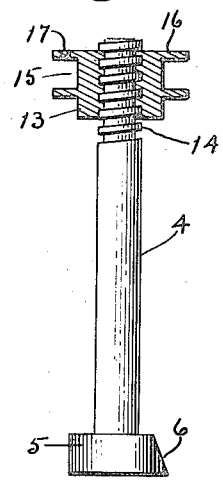
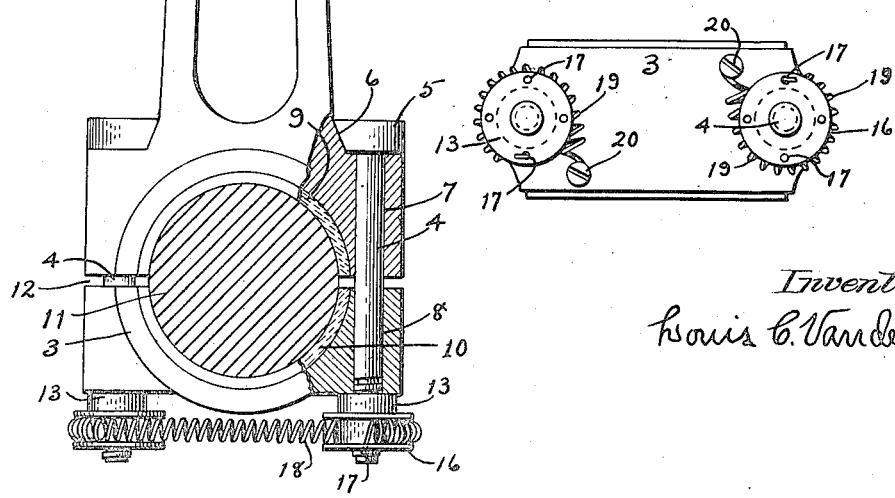
Inventor,
Louis C. Vanderlip.

Patented Dec. 19, 1922.

1,438,971

UNITED STATES PATENT OFFICE.

LOUIS C. VANDERLIP, OF ELKHART, INDIANA.

SELF-ADJUSTING BEARING NUT.

Application filed June 29, 1922. Serial No. 571,590.

*To all whom it may concern:*

Be it known that I, LOUIS C. VANDERLIP, a citizen of the United States, residing in the city of Elkhart, county of Elkhart, Indiana, have invented certain new and useful Improvements in Self-Adjusting Bearing Nuts, of which the following is a specification.

This invention relates to shaft bearing boxes, and especially to means for automatically taking up the wear therein.

The principal object of the invention is to produce a self adjusting nut for a bearing bolt which is simple and of improved construction, and which may readily be applied to various bearings to effect automatic adjustment of the bearing cap for wear.

Another object of the invention is to produce a self adjusting bolt nut which when applied to an engine connecting rod, automatically effects adjustment of the rod cap for wear by a single spring connected with both nuts of the rod cap bolts.

Other objects of the invention are mentioned and described herein.

For convenience, I illustrate my invention applied to an engine connecting rod, but it will be readily appreciated that it is readily applicable to line shaft bearing boxes, or to any bearing box having an adjustable or removable cap.

The invention is illustrated on the accompanying drawing on which Figure 1 is a side elevation of an engine connecting rod to which my invention is applied, with parts broken away to clearly disclose the structure; Fig. 2 is a bottom plan view of the rod cap showing the spring arrangement and its relation to the bolt nuts; Fig. 3 is a view of the bolt and nut assembled; and Fig. 4 is a modification of the invention.

Similar numerals of reference indicate like parts throughout the several views on the drawing.

Referring to the drawing in detail, the numeral 1 indicates the body of a common type of internal combustion engine connecting rod which may have the usual piston pin bearing 2 at its upper end. The crank end of the rod is provided with the usual adjustable cap 3 adapted to be held on the rod by a pair of bolts 4, 4, each of which has its head 5 cut away, or flattened transversely, at 6 to engage the rod body to prevent rotation of the bolt in its bearings 7 and 8 in the rod head and cap, respectively. The rod head half box may be provided with a suitable metal bushing 9, and the cap 3 may be provided with a corresponding metal bushing 10, as is well known in the art, said bushings being adapted to engage and encompass the crank 11 of a crank-shaft—not shown. The cap 3 is spaced from the rod head at 12 to enable adjustment as wear occurs on the bushings 9 and 10, the usual shims at that point being eliminated to enable this invention to function properly, and the nuts 13, 13 threaded upon the bolt ends retain the cap 3 against displacement from the rod. Preferably, the nuts 13 are threaded upon the bolts by square threads 14 to minimize thread shearing possibilities and to insure ease of nut rotation thereon.

Each nut 13 is provided with the circumferential groove 15, and the end flange thereof 16 may be provided with a series of apertures 17 to enable the end of the coil spring 18 to be hooked or anchored therein. In operation, the bolts 4 are applied to the rod and the cap 3 mounted in the usual position in engagement with the crank 11 to enable the application of the nuts 13 to the bolts, said nuts being screwed snugly against the face of the cap. Thereafter, the coil spring 18 is placed under tension and connected with the nut apertures 17 and about or around the nuts within the groove 15, the plurality of apertures 17 enabling selective connection of the spring with each nut, whereby the spring may wholly or partially encompass the nut. Figures 1 and 2. It is advisable to effect rotation of the nuts 13 in the same direction to avoid the necessity of right and left hand threads on the bolts 4, and to accomplish this result the spring 18 is connected with the nuts 13 from opposite sides, as illustrated. The arrangement of the spring 18 within the nut groove 15 prevents lateral displacement of the spring from the nut when the connecting rod is rapidly reciprocating under high speed of the engine.

In Fig. 4 the modification illustrated contemplates the use of a separate spring 19 for rotating each nut 13, each spring being connected with an aperture 17 in the nut, as described, and anchored in the rod cap 3 at 20 by a screw, or in any suitable manner.

Obviously, as wear occurs on the bushings 9 and 10 by action of the crank 11 thereon, the tension of the spring 18, or the springs 19 of the modification, automatically rotates the nuts 13 forwardly on the bolt, thereby adjusting the rod cap 3 to the wear and holding it in snug engagement with the crank 11 at all times.

I claim:

1. The combination, with a bolt and nut, one of said members being rotatable with respect to the other, of a linearly extensible spring having its extensible portion engaged about said rotatable member and secured thereto for the purpose specified.

2. The combination, with a bolt and nut, one of said members being rotatable with respect to the other, of a linearly extensible spring having its extensible portion engaged about said rotatable member and secured thereto for the purpose specified, and means to prevent displacement of the member-engaging extensible portion of said spring from said rotatable member.

3. The combination, with a bolt and nut, one of said members being rotatable with respect to the other, of a coil spring partially encompassing said rotatable member and secured thereto for the purpose specified, said rotatable member having a flange overlapping the encompassing portion of said spring for preventing the displacement of the same.

4. The combination, with a bolt and nut, one of said members being rotatable with respect to the other and having a marginal groove extending around the same, of a coil spring arranged in said groove and partially encompassing said rotatable member, said spring being secured to said rotatable member for the purpose specified.

5. The combination, with a pair of bolts and nuts, one member of each pair being rotatable with respect to the other member thereof, of a coil spring extending between said rotatable members and having its coiled end portions partially encompassing and secured to them for the purpose specified.

6. The combination, with a pair of bolts and nuts, one member of each pair being rotatable with respect to the other member thereof, of a coil spring extending between said rotatable members and having its coiled end portions partially encompassing and secured to them for the purpose specified, and means to prevent displacement of said member-encompassing portions of said spring from said rotatable members.

7. The combination, with a pair of bolts and nuts, one member of each pair being rotatable with respect to the other member thereof, of a linearly extensible spring having extensible end portions thereof engaged about said rotatable members and secured thereto for the purpose specified, and means to prevent displacement of said member-engaging extensible portions of said spring from said rotatable members.

8. The combination, with a bolt and nut, one of said members being rotatable with respect to the other, of a coil spring extending about said rotatable member and secured thereto for the purpose specified, said rotatable member having means overlapping the spring for preventing the displacement thereof.

In witness whereof I have hereunto affixed my signature this 27th day of June, 1922.

LOUIS C. VANDERLIP.